United States Patent [19]
Eckhardt

[11] Patent Number: 5,161,831
[45] Date of Patent: Nov. 10, 1992

[54] SPACER SLEEVE

[75] Inventor: Uli Eckhardt, Speyer, Fed. Rep. of Germany

[73] Assignee: Deere & Company, Moline, Ill.

[21] Appl. No.: 744,132

[22] Filed: Aug. 13, 1991

[30] Foreign Application Priority Data

Sep. 7, 1990 [DE] Fed. Rep. of Germany ....... 4028380

[51] Int. Cl.$^5$ ............................................. F16L 27/00
[52] U.S. Cl. .................................... 285/276; 285/279; 285/375
[58] Field of Search ................ 285/274, 268, 269, 270, 285/375

[56] References Cited

U.S. PATENT DOCUMENTS

| | | | |
|---|---|---|---|
| 1,952,451 | 3/1934 | Mitchell | 285/279 |
| 2,714,021 | 7/1955 | Froidevaux | 285/375 X |
| 3,469,850 | 9/1969 | Jackson et al. | |
| 4,337,951 | 7/1982 | Perego | |

FOREIGN PATENT DOCUMENTS

| | | |
|---|---|---|
| 1475763 | 6/1972 | Fed. Rep. of Germany . |
| 629052 | 9/1949 | United Kingdom . |

Primary Examiner—Dave W. Arola

[57] ABSTRACT

A sleeve element is installed between two hollow gear shafts which are rotatably coupled relatively to each other by a bearing. The sleeve has a hollow cylindrical body which is received inside one of the shafts. The sleeve has a plurality of slots in one end thereof which permit lubricating oil to flow to the bearing. A plurality of spring elements project from the other end of the cylindrical body. The spring elements engage the one shaft and are biassed to urge the one end of the body against an end surface of the other shafts. The force of the spring elements is active at least during primary assembly of the shafts. At a particular temperature, such as the operating temperature of the shafts, the spring elements lose their force. Preferably, the spring elements and the cylindrical body are integrally formed of one part.

7 Claims, 1 Drawing Sheet

SPACER SLEEVE

BACKGROUND OF THE INVENTION

The present invention relates to a spacer or spacing sleeve for the spacing of two parts, in particular for spacing two hollow gearbox shafts that can rotate with respect to each other.

When coupling together two hollow gearbox shafts which rotate relative to each other, it is known to use piston rings to control the relative axial position of the shafts. For example, such piston rings are installed in a radial groove in one of the hollow shafts. In the assembled condition the outer circumferential surface of the piston rings is in contact with the second hollow shaft. Since the position of the piston rings cannot be inspected visually during assembly, an unintended shearing of the piston ring is frequently not discovered during assembly, but only after problems develop during operation. Another disadvantage in the use of piston rings is that with increasing diameter of the rings the power loss due to friction climbs rapidly.

If a sleeve-type spacer element is used to maintain a desired spacing between the relatively rotating parts, then surfaces of the spacer sleeve will frictionally engage corresponding surfaces of the relatively rotating parts. For example, an outer surface of the sleeve will contact a corresponding inner bore surface of one the parts, and end faces of the sleeve will engage corresponding axially facing surfaces on the parts.

SUMMARY OF THE INVENTION

An object of the present invention is to provide an improved spacer arrangement which assures the desired spacing between two parts while avoiding the problems described above.

This and other objects are achieved by the present invention wherein a spacer sleeve is inserted between a pair of relatively rotating hollow shafts. The spacer sleeve has a cylindrical body, a plurality of spring members which project from the end of the body and a plurality of pockets in the end of the body for receiving the spring members when they are in a retracted position. During assembly, the spring members cause opposite ends of the spacer sleeve to engage corresponding surfaces on the shafts. At elevated operating temperatures the spring members retract into the pockets, thereby reducing or eliminating the spring force so that, during subsequent operation of the shafts, there are no friction losses and no wear. Recesses or slots in the end face of the sleeve provide a metered flow of lubricating oil to a bearing between the shafts. Detent cam members on the outer surface of the other end face of the sleeve hold the sleeve within one of the shafts.

DETAILED DESCRIPTION

Figure 1:
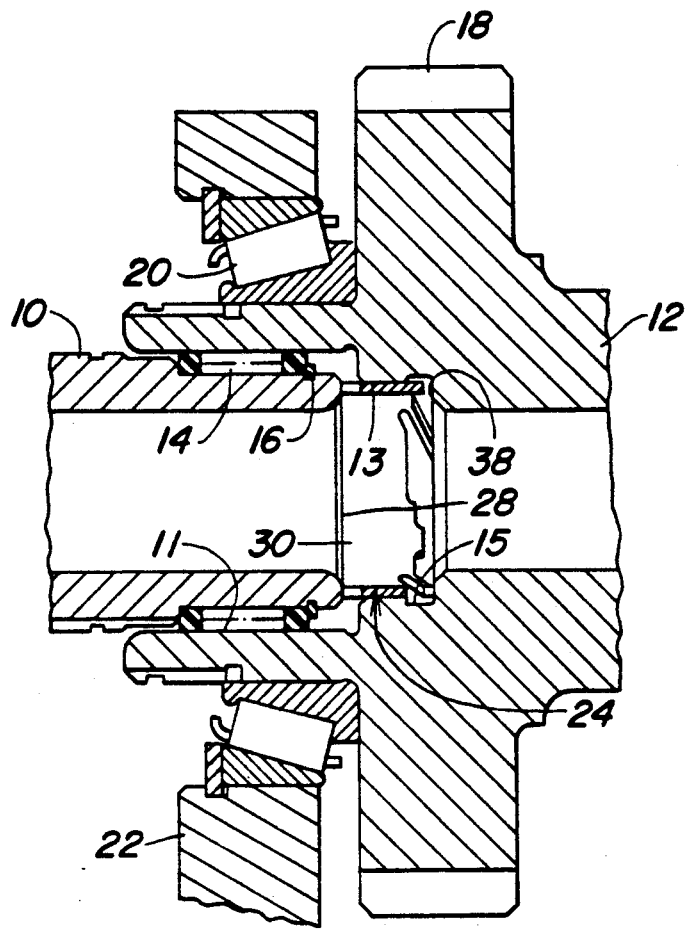
FIG. 1 is a cross-sectional view of a portion of a pair of hollow gearbox shafts with a sleeve according to the present invention.

FIG. 1 shows a section of a gearbox and drive line. A first hollow gearbox shaft 10 extends partially into bore 11 in a second hollow gearbox shaft 12 and is supported for rotation therein by a needle bearing 14. The needle bearing 14 is secured by a snap ring 16 which is mounted in a groove in shaft 10. Shaft 12 carries a gear 18 and is supported in a roller bearing 20 in the gearbox housing 22. A flow of oil is conducted through the interior 30 of the two hollow shafts 10, 12 in order to provide necessary lubricating oil or coolant to gearbox bearings, gears, synchronizers and other components (not shown).

Moving axially inwardly from bore 11, the shaft 12 forms a smaller diameter bore 13 and a larger diameter bore 15. Bores 13 and 15 are joined by an annular shoulder 17 which faces away from shaft 10. A sleeve 24 with a hollow cylindrical body 40 is received in bores 13 and 15 between axially facing end face 28 of shaft 10 and annular axially facing surface 38 of shaft 12. Its first end face 26 acts as an abutment surface for engagement with end face 28 of shaft 10. Two slots 29 are located opposite each other and extend axially into end face 26. These slots permit a small, metered amount of oil to flow therethrough to the needle bearing 14 in order to lubricate it.

Figure 2:
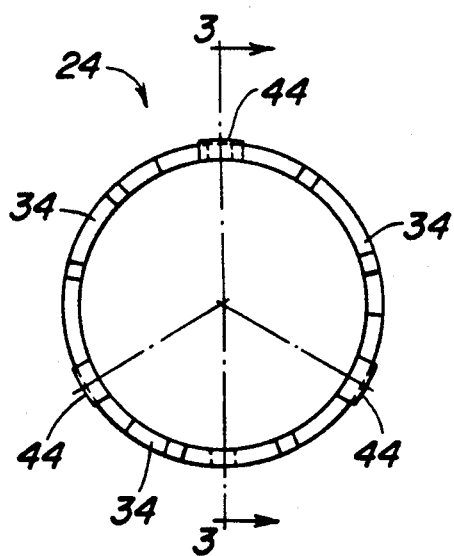
FIG. 2 is an end view of the sleeve by itself.
Figure 3:
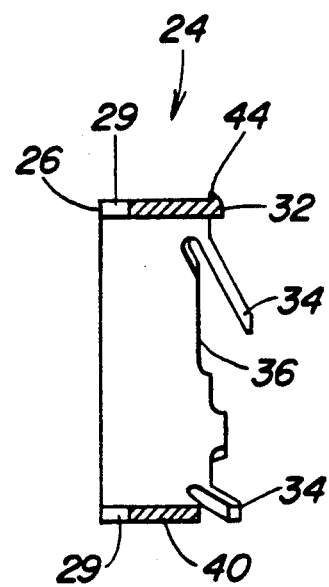
FIG. 3 is a sectional view along line 3—3 of FIG. 2.

Three spring members 34 project from the other end face 32 of the sleeve 24. As best seen in FIG. 2, the spring members 34 generally conform to the cylindrical shape of the sleeve 24. The three spring members 34 are preferably spaced equally around the circumference of the sleeve 24. A plurality of pockets 36 are formed in the end face 32. Each pocket 36 is positioned to receive a corresponding one of the spring members 34 when the spring member is pressed axially towards the body 40. When the sleeve 24 is installed into shaft 12 the spring members 34 engage the end face 38 of shaft 12, and resiliently urge the sleeve 24 away from surface 38 and towards shaft 10.

Three cam members 44 project radially outward from the body 40 of sleeve 24 adjacent to end face 32 and are spaced equally around the circumference of sleeve 24. When the sleeve 24 is installed into shaft 12, the cams 44 project into bore 15 and resiliently engage as detents the annular shoulder 17 which connects bore 13 to bore 15. During assembly the sleeve 24 can then snap into place in the shaft 12, and is retained there during the assembly of the shaft 10. The three spring members 34, the cam members 44 and the body 40 are preferably integrally formed of a plastic material, and may be formed, for example, as a plastic injection molding, whereby a low cost component is achieved.

During assembly, the sleeve 24 is initially pushed axially into bore 13 of shaft 12 until the cams 44 snap into bore 15. Then shaft 10, which carries the needle bearing 14, is inserted into bore 11 of shaft 12, whereby the sleeve 24 is compressed so that the spring members 34 are deflected with increasing spring pre-load towards the body 40 of the sleeve 24. When the gearbox is put into operation the oil flowing in the interior 30 is heated. When an operating temperature is reached the spring members 34 retract into the pockets 36 and the force exerted by the sleeve 24 on the corresponding opposing surfaces 28, 38 of the shafts 10, 12 is reduced or eliminated. As a result, the sleeve 24 can move axially after assembly and that its end faces are not constantly in contact with the corresponding surface 28, 38, and the sleeve 24 exerts very little or no force against these surfaces 28, 38, and very little or no wear or friction losses can occur. Also, the design provides axial clearances which accommodate manufacturing tolerances and thermal expansion at elevated operating temperatures.

By virtue of the spring member variations in gaps can be equalized, for example, those caused by manufacturing tolerances, by combinations of varying components, and/or changes in lengths or gaps due to temperature changes between the two shafts. The sleeve 24 makes possible a simple and safe assembly of hollow gearbox shafts, even at locations that cannot be inspected visually.

The sleeve 24 is preferably applied to gearboxes and drive lines in particular in agricultural tractors or other utility vehicles that have coupled coaxial shafts which rotate at different relative speeds.

Although the present invention has been described in terms of what are at present believed to be its preferred embodiments, it will be apparent to those skilled in the art that various changes may be made to these embodiments without departing from the scope of the invention. It is therefore intended that such structures are also encompassed by the following claims.

I claim:

1. In a gearbox assembly comprising a first hollow shaft rotatably received in an end of a second hollow shaft and held in assembled relationship therewith, a sleeve for maintaining a desired spacing between the first and second shafts, the sleeve having a hollow cylindrical body, characterized by:
   one end of the body engaging one of the first and second shafts and the sleeve having at least one spring member projecting resiliently from the other end of the body for engagement with the other of the shafts and for resiliently urging the body towards the one shaft with a preload force, the at least one spring member being formed integrally with the body and the at least one spring member projects from an annular end face of the body.

2. The sleeve of claim 1, characterized by:
   the at least one spring member loses its preload force at a temperature which is higher than a temperature at which the shafts and the sleeve are assembled.

3. The sleeve of claim 2, characterized by:
   the higher temperature corresponds to an operating temperature of the shafts.

4. The sleeve of claim 1, characterized by:
   a plurality of recesses are formed in an end face of the body.

5. The sleeve of claim 1, wherein:
   the at least one spring member projects axially away from the body and has a shape which generally conforms to the cylindrical shape of the body.

6. The sleeve of claim 1, wherein:
   at least one pocket is formed in an end face of the body, each at least one pocket being positioned to receive the corresponding at least one spring member when the spring member is pressed axially towards the body.

7. In a gearbox assembly comprising a first hollow shaft held in assembled relationship with and rotatably received in an end of a second hollow shaft, a sleeve for maintaining a desired spacing between the first and second shafts, the sleeve having a hollow cylindrical body, characterized by:
   one end of the body engaging one of the first and second shafts and the sleeve having at least one spring member projecting resiliently from the other end of the body for engagement with the other of the shafts and for resiliently urging the body towards the one shaft with a preload force, and detent means for retaining the sleeve in the second shaft, the detent means comprising at least one cam member which projects radially outward from an end of the body.

* * * * *